United States Patent [19]
Kirkbride

[11] 3,906,914
[45] Sept. 23, 1975

[54] REDUCTION AND CONTROL OF ATMOSPHERIC POLLUTANTS EMITTED FROM GASOLINE POWERED INTERNAL COMBUSTION ENGINES

[76] Inventor: James W. Kirkbride, 1071 Santa Rosa Ave., Costa Mesa, Calif. 92626

[22] Filed: Apr. 4, 1973

[21] Appl. No.: 347,903

[52] U.S. Cl. ....... 123/122 AA; 123/122 H; 123/141
[51] Int. Cl. ............................................. F02m 31/00
[58] Field of Search ... 123/122 AA, 52 MV, 122 H, 123/119 A, 141, 133; 60/278, 319, 308, 307; 165/52

[56] References Cited
UNITED STATES PATENTS

| | | | |
|---|---|---|---|
| 1,128,998 | 2/1915 | Mulvaney | 165/52 |
| 1,793,554 | 2/1931 | Moose | 123/119 A |
| 2,084,142 | 6/1937 | Horton | 123/119 A |
| 2,981,480 | 4/1961 | Else | 123/122 H |
| 3,019,781 | 2/1962 | Kolber | 123/122 H |
| 3,042,016 | 7/1962 | Christian | 123/122 AA |
| 3,053,242 | 9/1962 | Arpaia | 123/122 AA |
| 3,393,984 | 7/1968 | Wisman | 123/141 |
| 3,509,860 | 5/1970 | Ferriday | 123/122 R |
| 3,657,878 | 4/1972 | Kaufmann | 160/308 |

FOREIGN PATENTS OR APPLICATIONS

| | | | |
|---|---|---|---|
| 116,303 | 6/1918 | United Kingdom | 165/52 |

Primary Examiner—Charles J. Myhre
Assistant Examiner—R. H. Lazarus
Attorney, Agent, or Firm—Philip M. Hinderstein

[57] ABSTRACT

In a gasoline powered internal combustion engine including a carburetor having one or more outlet ports mounted on an intake manifold having one or more mating inlet ports, there is disclosed a system for reducing the atmospheric pollutants emitted from the engine by simultaneously converting the gasoline to its gaseous state and causing isotropic mixing of the gasoline and oxygen molecules. The apparatus comprises heating means including a plate having a planar, solid, upper surface, the area of which is equal to or greater than the total area of the carburetor outlet ports, mounted with the upper surface of the plate directly in the path of the fuel/air mixture exiting the carburetor outlet ports thereby causing the high velocity fuel droplets to strike the upper surface of the plate and also causing the now gas-to-gas fuel/air mixture to follow a circuitous path around the plate. The plate is mounted so as to provide an air flow area around the heating means which is at least as great as the total area of the carburetor outlet ports so as not to reduce the total air flow to the engine. Heat is conducted to the heating means from the engine exhaust system in such a manner that the amount of heat is directly proportional to the speed of the engine, thereby maintaining the temperature of the heating means essentially constant over the range of normal engine operating speeds.

4 Claims, 7 Drawing Figures

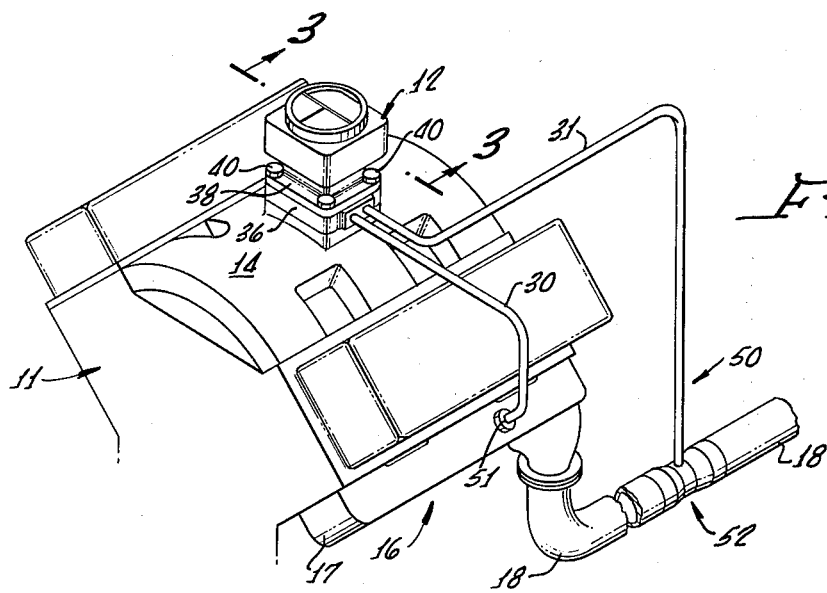
FIG. 1.
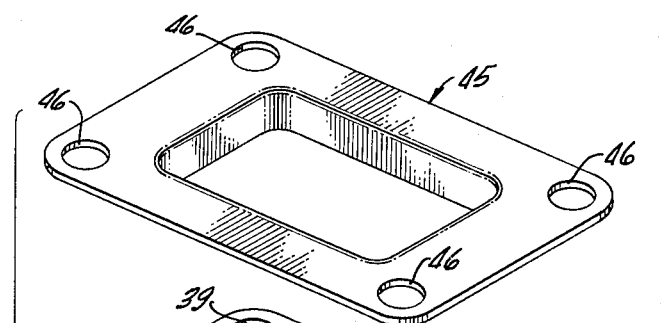
FIG. 2.
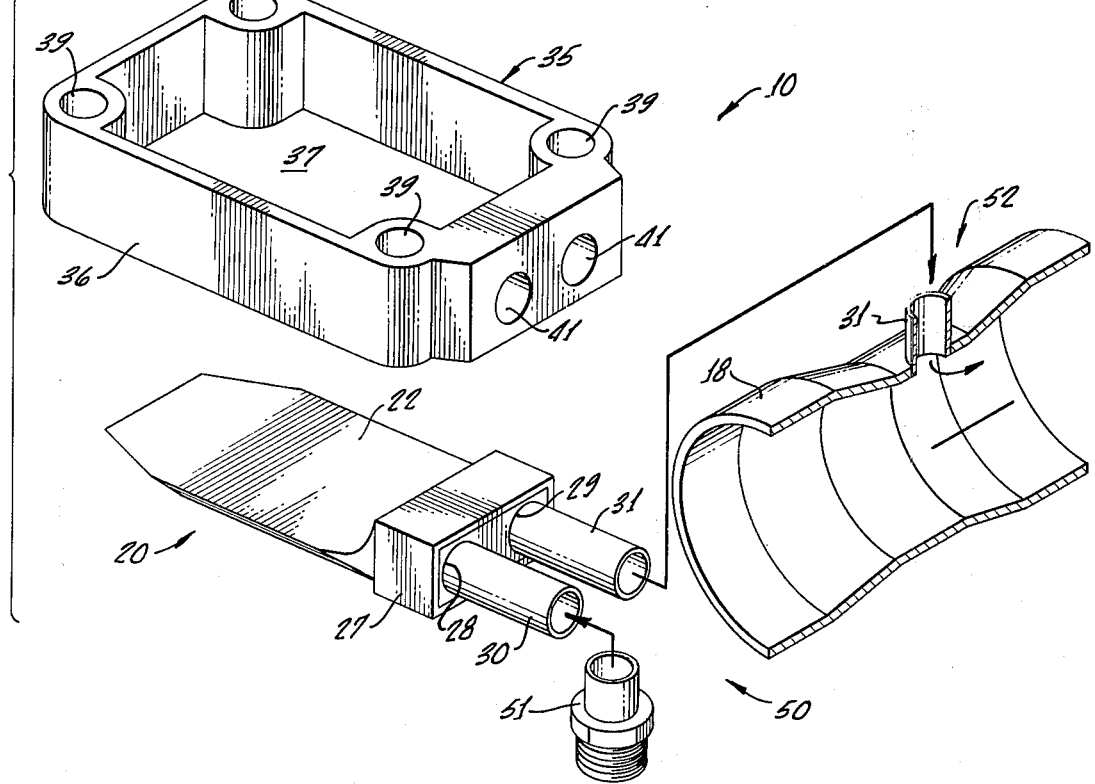

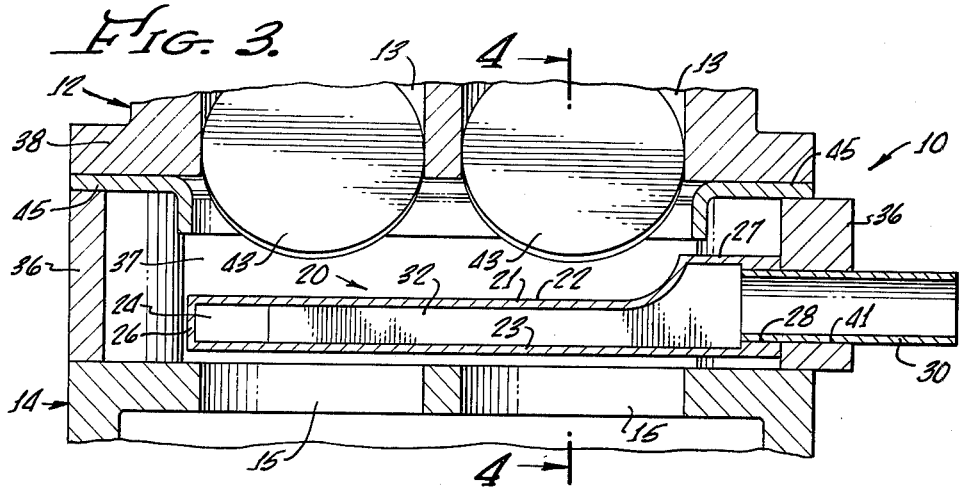
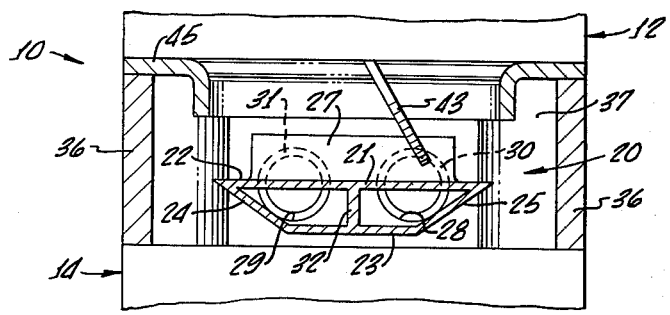
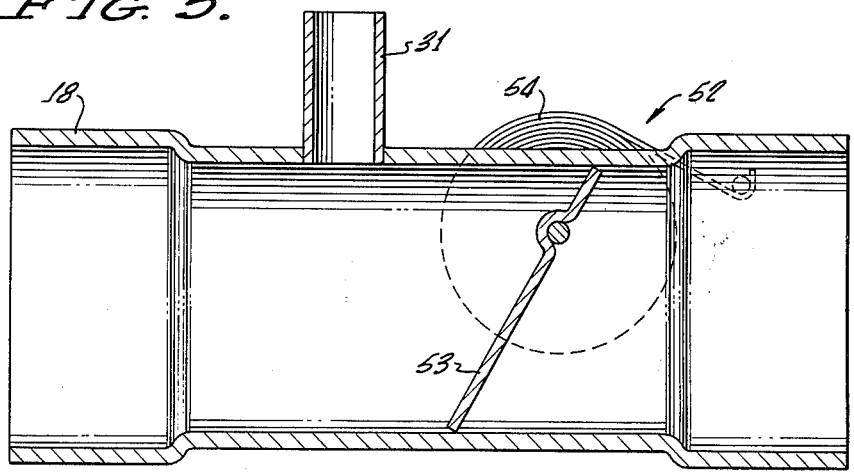

REDUCTION AND CONTROL OF ATMOSPHERIC POLLUTANTS EMITTED FROM GASOLINE POWERED INTERNAL COMBUSTION ENGINES

BACKGROUND OF THE INVENTION

1. Field of the Invention.

The present invention relates to the reduction and control of atmospheric pollution emitted from gasoline powered internal combustion engines and, more particularly, to apparatus for converting the gasoline in internal combustion engines to its gaseous state and simultaneously causing isotropic mixing of the gasoline and oxygen molecules.

2. Description of the Prior Art.

Virtually all motor vehicles operating in the world today use gasoline powered internal combustion engines and the operation of such engines is essentially always controlled by a carburetor. While there are many different types of carburetors, they all operate to regulate and control the amount of air and fuel admitted to the engine. Because of the many, varied operating conditions the engine is subjected to, from curb idle to wide open throttle, such carburetors are complicated devices consisting of many component parts. Such component parts are intended to cooperate in such a manner as to properly control the air/fuel mixture ratio, regardless of the operating conditions.

Because of the extent of the problem, it is only necessary to briefly mention that the widespread use of gasoline enginepowered motor vehicles has created a serious, worldwide, air pollution problem. While the automobile engine is not the only contributor to such problem, it has, for many years, played a significant role. The engine is responsible for the generation of three primary air polluting ingredients, carbon monoxide (CO), oxides of nitrogen ($NO_x$), and unburned hydrocarbons (HC).

Tests show that the degree of air pollution caused by an automobile engine depends, in large measure, on the efficiency with which the engine burns fuel and oxygen. Complete or near complete combustion of fuel and oxygen, leaving no unburned hydrocarbons and creating no carbon monoxide fumes or oxides of nitrogen, can result in an insignificant amount of pollution from an automobile engine. On the other hand, incomplete or improper combustion in a gasoline engine creates substantial amounts of air pollution.

In the past, the main concern of those charged with the responsibility of designing and and building mass production carburetors and intake manifold systems was the production of power for acceleration and high speeds. Little concern was given to the efficiency of combustion and engine emissions. As a result, the ability of the carburetor to regulate and control the air/fuel mixture to tolerances which would result in complete or near complete combustion of the fuel was nonexistant and performance characteristics from one engine to another varied widely.

Heretofore, various systems and methods have been proposed for improving engine combustion efficiency, sometimes with a view towards reducing exhaust pollutants. With the rising public concern regarding air pollution, certain laws and regulations have been passed to control the operation of gasoline engines by specifying allowable levels of engine exhaust emissions. However, those involved in this field have generally been unable to satisfactorily meet such requirements, for a variety of reasons.

One such prior art approach suggested the heating of the total air/fuel mixture so as to vaporize the fuel. Through thorough and effective vaporization of the combustable mixture, better performance of the engine throughout its operating range may be obtained. However, essentially all systems heating the total mixture achieve just the opposite result by decreasing the volumetric efficiency, thereby increasing pollutants.

Volumetric efficiency is defined as the weight of the fresh air inducted into the cylinder of an internal combustion engine during the intake, or charging, stroke of the piston compared with the weight of the air required to fill a volume equal to the piston displacement at outside temperature and pressure. As volumetric efficiency is degraded, the fuel/air mixture is enriched resulting in fewer oxygen molecules per cubic foot of air and the emission of exhaust pollutants increases significantly.

A modern engine's intake system has air flow passages of a size to accommodate the cubic inch displacement of that particular engine. Any restriction of the size of those air intake passages will adversely effect the engine's volumetric efficiency by reducing the volumetric capacity of those passages. In the standard, unsupercharged engine, preheating of the air of the charge entering the cylinder also causes a degradation of volumetric efficiency, the degree of degradation depending upon how much the heat lessens the density of the air through expansion. In other words, most existing systems have attempted to vaporize fuel by heating the intake manifold or in some other way heating the entire air/fuel mixture. However, it has not been recognized that such techniques decrease the effective air flow area by increasing the air temperature which decreases the density of the air. This causes the mixture to enrichen so that there are insufficient oxygen molecules for the available gasoline molecules.

Also overlooked in the prior art is the chemical makeup of modern gasolines and their boiling points. It is customary to assume that modern gasoline is a mixture of hydrocarbons with an average octane of $C_8H_{18}$. In reality, however, the molecule may contain from 6 to 10 carbon atoms with boiling points ranging from 150° to 300° F. This is significant when coupled with the fact that only a few thousandths of a second elapse between the time a droplet of gasoline exits the carburetor throat and enters the intake valve of one of the engine's cylinders. In this extremely short time interval, it is obvious that any attempt to convert the gasoline droplet to its totally gaseous state by preheating the total mixture would require that the total mixture be heated to hundreds of degress above that of the outside air. The resultant loss of volumetric efficiency, with its attendant increase in the emission of exhaust pollutants, would be unacceptable, regardless of the engine's application.

Still further, some prior art systems that attempt to vaporize fuel in an internal combustion engine position some kind of heating element in the path of the air/fuel mixture. However, what has been overlooked is the fact that a gasoline droplet suspended in air that is passing near or around a heating element will not necessarily be caused to convert to its gaseous state. To insure that the droplet is totally converted to its gaseous state, it must collide with or splash onto the heating element and the heating element must be capable of maintaining a temperature that will cause instant boiling of the fuel droplets regardless of the volume flowing over the element. Furthermore, the heating element must automatically reduce its heat capacity at low gasoline flow so as not to flash the fuel.

Still further, even though a hydrocarbon fuel has been converted to its gaseous state, it still will not burn completely or efficiently unless it is thoroughly mixed with the oxidizer. When gasoline is converted to its gaseous state and then thoroughly mixed with air so that there is near isotropic distribution of the hydrocarbon and oxygen molecules, combustion can occur at or near stoichiometric conditions. During such combustion, more molecular combinations are produced and more hydrocarbon and oxygen molecules are consumed. Combustion that occurs at or near stoichiometric conditions also enhances the preferential formation of water vapor and carbon dioxide, both desirable emissions, and further reduces the number of free oxygen molecules available in the combustion chamber to form other oxides such as carbon monoxide and oxides of nitrogen.

SUMMARY OF THE INVENTION

According to the present invention, the atmospheric pollutants emitted from a gasoline powered internal combustion engine are substantially reduced without creating any adverse effect whatever on the engine or decreasing fuel economy. The present invention significantly reduces the emission of unburned hydrocarbons, carbon monoxide, and oxides of nitrogen. This is achieved by a unique combination of two fundamental principles, namely converting the gasoline to its gaseous state and simultaneously causing isotropic mixing of the gasoline and oxygen molecules. This is achieved without any significant increase in the temperature of the total fuel/air mixture and without restricting the area of the air/fuel flow path. As a result, volumetric efficiency is not degraded and more efficient combustion results. The present invention converts the gasoline to its gaseous state, not by preheating the total mixture, but by causing the gasoline droplets to splash onto a heating element, thereby causing instant boiling of the fuel droplets. Furthermore, the temperature of such heating element is controlled so as to be directly proportional to the speed of the engine so that the applied heat responds instantaneously to changes in throttle settings. This also permits instantaneous reduction in heat capacity at low gasoline flow so as not to flash the fuel. The present apparatus is readily adaptable to existing internal combustion engines or may be readily built into new engine installations.

Briefly, the present apparatus for converting gasoline to its gaseous state and simultaneously causing isotropic mixing of the gasoline and oxygen molecules comprises heating means including a plate having a planar, solid, upper surface, the area of which is equal to or greater than the total area of the carburetor outlet ports, mounted with the upper surface of the plate directly in the path of the fuel/air mixture exiting the carburetor outlet ports thereby causing the fuel/air mixture to follow a circuitous path around the plate. The plate is mounted so as to provide an air flow area around the heating means which is at least as great as the total area of the carburetor outlet ports so as not to reduce the total air flow to the engine. Heat is conducted to the heating means from the engine exhaust system in such a manner that the amount of heat is directly proportional to the speed of the engine, thereby maintaining the temperature of the heating means essentially constant over the range of engine operating speeds.

OBJECTS

It is therefore an object of the present invention to reduce and control atmospheric pollutants emitted from gasoline powered internal combustion engines.

It is a further object of the present invention to provide apparatus for converting the gasoline in internal combustion engines to its gaseous state and simultaneously causing isotropic mixing of the gasoline and oxygen molecules.

It is a still further object of the present invention to reduce atmospheric pollutants emitted from gasoline powered internal combustion engines by converting gasoline to its gaseous state and causing isotropic mixing without reducing the volumetric efficiency of the engine.

It is another object of the present invention to convert gasoline to its gaseous state by causing all gasoline droplets to splash onto a heater element.

It is still another object of the present invention to provide an atmospheric pollution reduction system in internal combustion engines which responds instantly to changes in throttle settings.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like parts of the several figures and wherein:

BRIEF DESCRIPTION OF THE DRAWINGS

FIG. 1 is a perspective view of a modern gasoline powered internal combustion engine showing the location of the intake and exhaust manifold and the carburetor, with the present atmospheric pollution reduction apparatus in place;

FIG. 2 is an exploded, enlarged view, of the atmospheric pollution reduction apparatus of FIG. 1;

FIG. 3 is an enlarged sectional view taken along the line 3—3 in FIG. 1;

FIG. 4 is a sectional view taken along the line 4—4 in FIG. 3;

FIG. 5 is a sectional view of a second embodiment of means for creating an area of low pressure in the exhaust system of the engine of FIG. 1;

DESCRIPTION OF THE PREFERRED EMBODIMENTS

Figure 6:
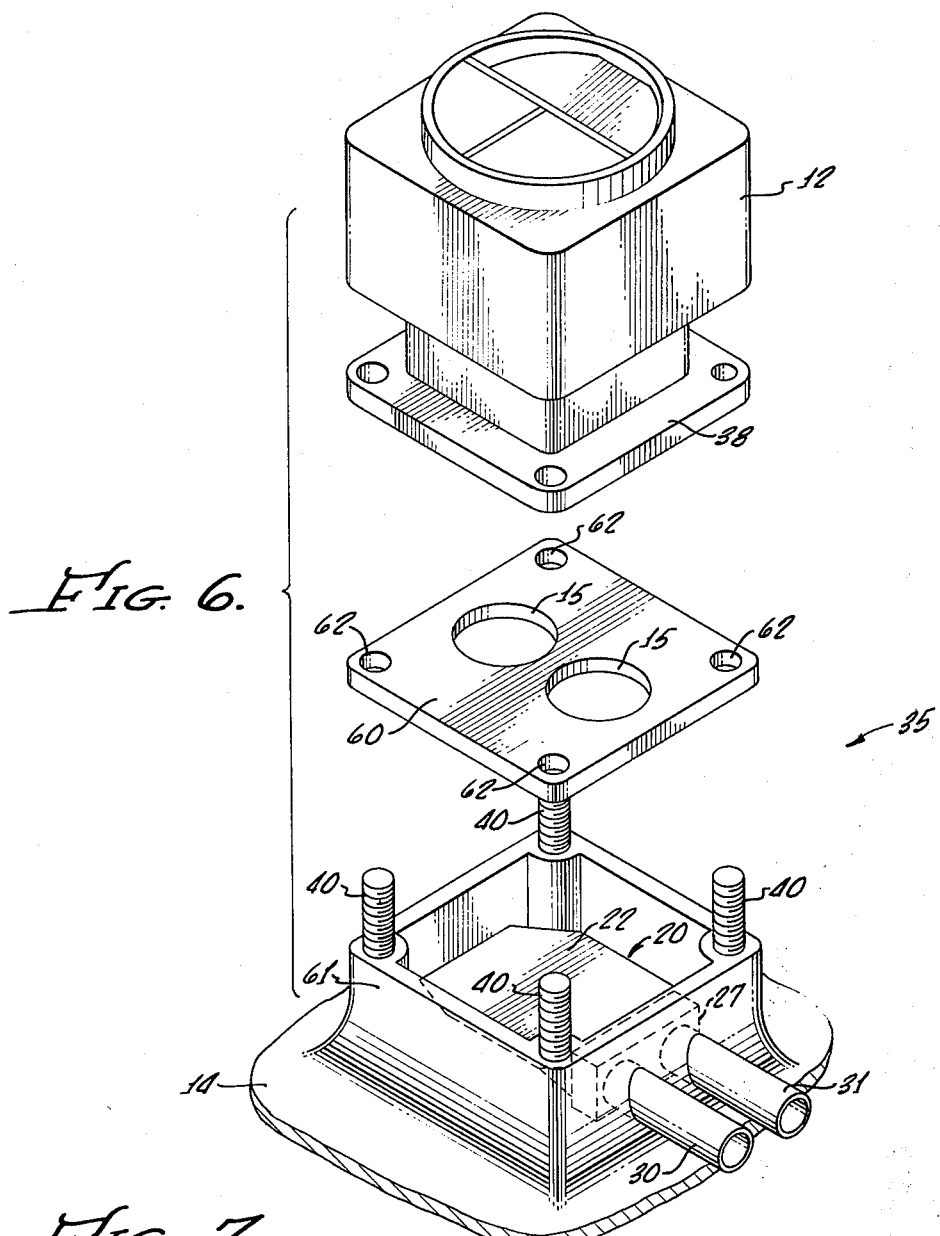
FIG. 6 is an exploded perspective view of a portion of the engine of FIG. 1 showing the manner in which the present apparatus may be installed in a new engine.

Referring now to the drawings and, more particularly, to FIGS. 1–4 thereof, there is shown apparatus, generally designated 10, for reducing the atmospheric pollutants emitted from a gasoline powered internal combustion engine, generally designated 11. Engine 11 is of the type including a carburetor 12 having one or more outlet ports 13 mounted on an intake manifold 14 having one or more mating inlet ports 15. Engine 11 also includes an exhaust system, generally designated 16, including one or more exhaust manifolds 17 and one or more exhaust pipes 18.

Apparatus 10 reduces the atmospheric pollutants emitted from engine 11 without any adverse effects on engine 11 or its fuel economy. Generally speaking, atmospheric pollution is reduced by converting the gasoline exiting outlet ports 13 of carburetor 12 to its gaseous state and simultaneously causing isotropic mixing of such gasoline molecules with oxygen molecules. Broadly speaking, such conversion of gasoline to its gaseous state and the simultaneous isotropic mixing of the gasoline and oxygen molecules is accomplished by providing heating means, generally designated 20, including a plate 21 having a planar, solid, upper surface 22, the area of which is equal to or greater than the total area of outlet ports 13, by mounting heating means 20 with surface 22 of plate 21 directly in the path of the fuel/air mixture exiting outlet ports 13 to cause the high velocity fuel droplets to strike surface 22 of plate 21 and to cause the fuel/air mixture to follow a path around plate 21, and by applying heat to heating means 20 in an amount which is directly proportional to the speed of engine 11, thereby maintaining the temperature of surface 22 of plate 21 essentially constant over the range of engine operating speeds.

More particularly, heating means 20 is a generally rectangular, hollow member, plate 21 defining the top thereof. Member 20 also includes a bottom plate 23, side plates 24 and 25 and an enclosing end plate 26. The other end of member 20 includes a manifold 27 having heat inlet and outlet ports 28 and 29, respectively, therein. As will be described more fully hereinafter, hot exhaust gases from exhaust system 16 of engine 11 are conducted via first conduit means 30 to heat inlet ports 28, which exhaust gases are conducted into hollow member 20. Member 20 is internally divided into two chambers by a vertical plate 32 connected between plates 21 and 23, plate 32 being spaced from end plate 26 so as to permit circulation between the two sides of member 20. After circulating around member 20, the hot exhaust gases are conducted via heat outlet port 29 to second conduit means 31 which conducts the exhaust gases back to exhaust system 16 of engine 11.

As mentioned previously, surface 22 of plate 21 of heating means 20 has an area which is equal to or greater than the total area of carburetor outlet ports 13. Apparatus 10 includes means, generally designated 35, for mounting heating means 20 with upper surface 22 of plate 21 directly in the path of the fuel/air mixture exiting carburetor outlet ports 13. Where apparatus 10 is added to existing engines, mounting means 35 may include an annular member 36 defining an enclosed chamber 37, member 36 having a shape corresponding to the base 38 of carburetor 12 and being positioned between base 38 of carburetor 12 and intake manifold 14 of engine 11. For this purpose, annular member 36 may have a plurality of bores 39 therein so positioned to receive the bolts 40 usually extending from intake manifold 14. Thus, annular member 36 may be positioned on intake manifold 14, with bolts 40 extending through bores 39, whereupon base 38 of carburetor 12 may be connected to bolts 40 in the usual manner.

Annular member 36 has a pair of horizontally spaced bores 41 in one side thereof, the diameter thereof and spacing therebetween being equal to the diameter of and spacing between first and second conduit means 30 and 31. Thus, heating means 20 may be positioned within chamber 37, with conduit means 30 and 31 passing through bores 41 in member 36, as shown most clearly in FIG. 3. Furthermore, heating means 20 may be attached to annular member 36 and retained in the position shown in FIGS. 3 and 4 in any suitable manner.

The shape of heating means 20 and its location relative to mounting means 35 is such that an air flow area is provided around heating means 20 which is at least as great as the total area of carburetor outlet ports 13 and intake manifold inlet ports 15. Thus, the spacing between the sides of plate 21 and the walls of annular member 36 as well as the spacing between surface 22 and base 38 of carburetor 12 and the spacing between bottom plate 23 and intake manifold 14 are all designed so as to provide a flow area for the air/fuel mixture which is at least 100% or more of the total area of carburetor outlet ports 13, so as not to reduce the total volume of the air flow. The total volume of air flow is maintained so as not to cause an enriching of the air/fuel mixture which would decrease the volumetric efficiency and result in increased emissions of HC and CO.

The shape of heating means 20 and its position within mounting means 35 is also such that heating means 20 will not cause interference with the throttle valves 43 of carburetor 12 as they rotate below base 38 of carburetor 12 at full throttle. However, because surface 22 must be set at a depth relative to base 38 so as to prevent such interference, it is necessary to insure that the incoming mixture does not streamline around heating means 20 at higher engine RPM's. For this purpose, an air control shroud 45 may be positioned immediately above heating means 20, between base 38 of carburetor 12 and annular member 35, so as to direct the air/fuel mixture against upper surface 22 of plate 21. Shroud 45 also creates a much more pronounced sheer as the incoming air starts its path around heating means 20. Shroud 45 may be mounted by providing suitable holes 46 therein which may be aligned with bores 39 in annular member 36 to receive bolts 40.

Apparatus 10 also includes means, generally designated 50, for applying heat to member 20 in an amount which is directly proportional to the speed of engine 11, so as to maintain the temperature of surface 22 of plate 21 essentially constant over the range of engine operating speeds. According to the preferred embodiment of the present invention, the heat is derived from the hot engine exhaust gases from exhaust system 16 of engine 11. Such hot exhaust gases may be derived from exhaust manifold 17 or any other point in exhaust system 16 near exhaust manifold 17. Therefore, heat applying means 50 includes first conduit means 30 connected between heat inlet port 28 of member 20 and the exhaust system 16 of engine 11. First conduit means 30 may be connected by a suitable fitting 51 to exhaust manifold 17.

In order to cause the flow of hot exhaust gases into first conduit means 30, heat applying means 50 includes second conduit means 31 which conducts the exhaust gases from heat outlet port 29 of heating means 20 to a suitable means, generally designated 52, in exhaust system 16, for creating an area of low pressure relative to the pressure at fitting 51. According to a first embodiment of the invention, and as shown in FIGS. 1 and 2, low pressure creating means 52 may comprise a slight restriction within exhaust pipe 18 of exhaust system 16 thereby creating a low efficiency venturi and a pressure drop between conduits 30 and 31. Furthermore, such pressure drop will be a function of the velocity of exhaust gas flow through exhaust pipe 18 so that the amount of exhaust gases conducted through conduits 30 and 31 and manifold 27 is directly proportional to the engine speed.

According to a second embodiment of the present invention, and as shown in FIG. 5, low pressure creating means 52 may include a butterfly valve 53 positioned within exhaust pipe 18 and held closed by a very light spring 54 so that the flow of exhaust gases through exhaust pipe 18 readily deflects valve 53. However, valve 53 provides a slight restriction causing a low pressure area on the downstream side thereof, where second conduit means 31 is connected to exhaust pipe 18. Again, the difference in pressure between conduit means 30 and 31 will be a direct function of the exhaust gas flow through exhaust pipe 18 which is directly proportional to the engine speed. In either event, low pressure creating means 52 is preferably positioned several feet downstream of the connection between first conduit means 30 and exhaust system 16 of engine 11 to provide a suitable pressure differential.

OPERATION

To achieve combustion in a gasoline powered internal combustion engine, both the fuel and oxidizer must be in the gaseous state. Gasoline droplets or particles that do not reach the gaseous state cannot burn and are emitted into the atmosphere as unburned hydrocarbons. Additionally, even though the hydrocarbon fuel has been reduced to its gaseous state, it still will not burn completely or efficiently unless it is thoroughly mixed with the oxidizer. When gasoline is converted to its gaseous state and then thoroughly mixed with air so that there is near isotropic distribution of the hydrocarbon and oxygen molecules, combustion can occur at or near stroichiometric conditions. During this combustion, more molecular combinations are produced and more hydrocarbon and oxygen molecules are consumed. Combustion that occurs at or near stoichiometric conditions also enhances the preferential formation of water vapor and carbon dioxide, both desirable emissions, and further reduces the number of free oxygen molecules available in the combustion chamber to form other oxides such as carbon monoxide and oxides of nitrogen.

With this in mind, apparatus 10 embodies two fundamental principles of combustion and combines them to effect the reduction of emissions. By converting gasoline to its gaseous state and simultaneously causing isotropic mixing of the gasoline and oxygen molecules, and combining these two principles precisely, emission reduction is significant without fuel and/or power penalties. HC, CO, and $NO_x$ emissions are reduced. Isotropic distribution of the gas-to-gas fuel/air mixture causes more of the HC in the combustion chamber to be consumed. There are fewer oxygen molecules available to form CO and $NO_x$ due to the increased consumption of oxygen during the more efficient burning of the HC and the further reduction of available oxygen molecules due to the formation of $H_2O$ and $CO_2$.

Apparatus 10 achieves this as follows: As the air/fuel mixture exits outlet ports 13 of carburetor 12, the fuel is in an atomized or small droplet state, suspended in the air stream. As the mixture approaches the planar, solid, upper surface 22 of plate 21, positioned directly under carburetor outlet ports 13, the air is forced to veer sharply through an angle of approximately 90° to seek a path around plate 21. The fuel droplets, being of a much greater weight than the air, cannot veer at the same rate on the same path as the air and, as a result, collide with upper surface 22 of heating means 20. This high velocity collision with the heated surface 22 causes instant conversion of all the fuel in the air stream to its gaseous state. Furthermore, tests have shown that this is accomplished without materially effecting the temperature of the total air/fuel mixture, thereby minimizing degradation of the volumetric efficiency of engine 12.

It is significant to note that the area of surface 22 is larger than the total area of carburetor outlet ports 13. Thus, the incoming air/fuel mixture is caused to seek a tortuous, generally U-shaped path around plate 21 before it can enter inlet ports 15 in intake manifold 14. This tortuous path causes turbulence resulting in the isotropic distribution of the now gas-to-gas hydrocarbon and oxygen molecules.

The area between the outer edges of plate 21 and the inner wall of member 36 is at least 100 percent and, preferably, at least 110% of the total area of carburetor outlet ports 13 so as not to reduce the total volume of the air flow. By maintaining the total volume of air flow, the mixture is not enriched which would result in increased emissions of HC and CO.

Heating means 20 is positioned in mixing chamber 37 at a depth that will not cause interference with throttle valves 43 as they rotate below base 38 of carburetor 12 at full throttle. To insure that the incoming mixture does not streamline around plate 21 at the higher velocities encountered at high engine RPM's and to insure that all fuel particles are caused to collide with surface 22, air control shroud 45 is positioned immediately above heating means 20. Shroud 45 also creates a much more pronounced sheer as the incoming air starts its path around plate 22.

Low pressure creating means 52 initiates and maintains the exhaust gas flow necessary to attain the desired temperature on surface 22 of plate 21. At idle, where there is a low fuel flow both through carburetor 12 and exhaust system 16, apparatus 10 is designed to maintain a temperature on surface 22 of approximately 250° to 300° F. As throttle valves 43 open, causing an increase in the quantity of the air/fuel mixture passing through mixing chamber 37, there is an immediate increase in the flow of exhaust gas through conduits 30 and 31 due to the pressure differential in exhaust system 16 and, therefore, an immediate temperature increase inside member 20. However, the extra heat is rapidly transmitted through the thin wall plate 21 of heating means 20. As the throttle is opened and the surface temperature of plate 21 starts to increase, there is a simultaneous increase in the quantity of fuel striking surface 22. The extra fuel absorbs the increased heat during its conversion to the gaseous state and, as a result, the temperature of surface 22 remains fairly constant during normal engine operation. As throttle valves 43 close, the process reverses itself.

Under full throttle or prolonged heavy engine loads, such as during hill climbs by a vehicle, the temperature of surface 22 of plate 20 will rise somewhat, perhaps to a maximum of 350° F. However, these higher temperatures are desirable because of the increased quantity of fuel striking surface 22. Thus, the desired temperature range on surface 22 of heating means 20 is automatically controlled regardless of the throttle opening or engine load.

Figure 7:
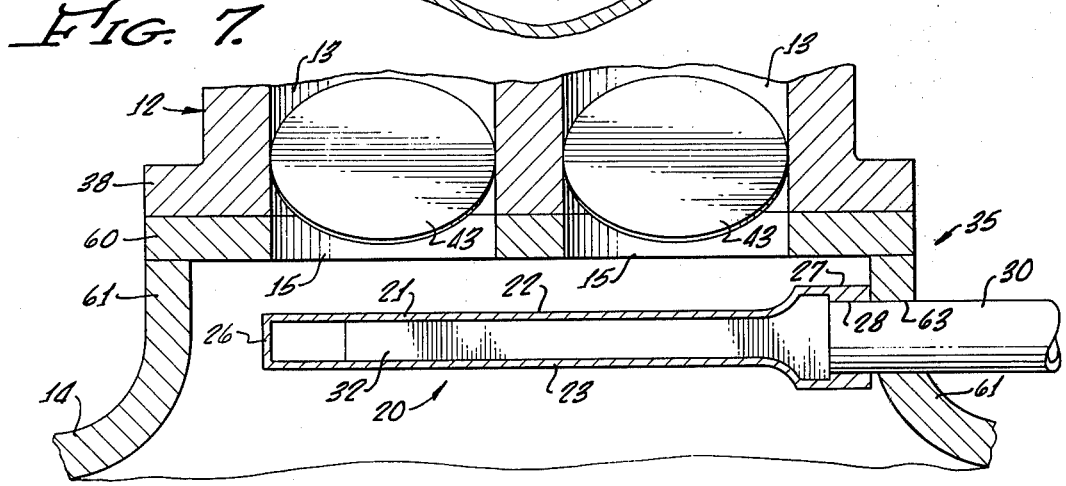
FIG. 7 is a longitudinal sectional view taken along the line 7—7 in FIG. 6.

Referring now to FIGS. 6 and 7, atmospheric pollution reduction apparatus 10 may be readily built directly into intake manifold 14 of engine 11 while requiring only slight modification thereof. In the embodiment of FIGS. 6 and 7, heating means 20 remains the same as in the embodiment of FIGS. 1–5 and includes a hollow member, plate 21 defining the top thereof. The only difference is that the shape of hollow member 20 relative to manifold 27 may be changed slightly. That is, in the embodiment of FIG. 3, there was a known spacing required between surface 22 and base 38 of carburetor 12 so that heating means 20 would not interfere with throttle valves 43. However, with heating means 20 now positioned beneath the top plate 60 of intake manifold 14, plate 21 may be spaced closer to the top of manifold 27 by an amount equal to the thickness of top plate 60. Other than this change, the heating means 20 of the embodiment of FIG. 6 and 7 is identical to that previously described.

Where apparatus 10 is built into a new engine, mounting means 35 need not include annular member 36 and air control shroud 45. As shown in FIGS. 6 and 7, it is only necessary to make top plate 60 of intake manifold 14 so that it is separate from the vertical walls 61 on which it rests and is usually made an integral part of. Instead, plate 60 has a plurality of holes 62 therein so positioned to receive the bolts 40 connected to manifold 14. Furthermore, one of vertical walls 61 may have a pair of horizontally spaced bores 63 therein, the diameter thereof and spacing therebetween being equal to the diameter of and spacing between first and second conduit means 30 and 31. Thus, in a new engine, mounting means 35 includes top plate 60 and bores 63 in one of vertical walls 61 whereby heating means 20 may be positioned directly within intake manifold 14, with conduit means 30 and 31 passing through bores 63. Heating means 20 may be secured within manifold 14 in any suitable manner. Furthermore, due to the thickness of top plate 60, surface 22 would normally be positionable about 0.5 inch below inlet ports 15, thereby eliminating the necessity for air control shroud 45.

The operation of heating means 20 in the embodiment of FIGS. 6 and 7 is identical to that previously described. The positioning of heating means 20 in intake manifold 14 is designed to provide a flow area for the air/fuel mixture which is at least 100 percent of the total area of intake manifold ports 15. Heating means 20 is positioned within intake manifold 14 so that it will not cause interference with throttle valves 43 of carburetor 12 as they rotate into inlet ports 15 at full throttle.

As the air/fuel mixture exits outlet ports 13 of carburetor 12 and enters inlet ports 15 in intake manifold 14, the fuel is in an atomized or small droplet state. As before, by positioning upper surface 22 directly under inlet ports 15, the air is forced to veer sharply through an angle of approximately 90° to seek a path around plate 21. The fuel droplets, being of a much greater weight than the air, cannot veer at the same rate on the same path as the air and, as a result, collide with upper surface 22 of heating means 20. This high velocity collision with the heated surface 22 causes instant conversion of all the fuel in the air stream to its gaseous state. Such gaseous fuel is swept up by the turbulating air passing around plate 21 causing isotropic distribution of of the now gas-to-gas hydrocarbon and oxygen molecules.

Heat could be applied to heating means 20 in the embodiment of FIGS. 6 and 7 in exactly the same manner as described previously. Such heat would be derived from the hot engine exhaust gases from exhaust system 16 of engine 11 and would be caused to flow by one of the two low pressure creating means 52 described previously. Alternatively, heat could be derived by tapping into the exhaust gas crossover pipe built into most modern V-8 engines.

The type of metal used in plate 21 of heating means 20 is significant as is the thickness of the metal throughout heating means 20. Although a surface of ordinary cold rolled steel provides adequate reductions of $NO_x$, CO, and HC, metals such as copper or monel are more efficient because of the low energy catalytic reactions occurring when the high velocity fuel particles strike surface 22 of plate 21. Wall thickness throughout heating means 20 may be on the order of 0.040 inch or less to maintain the total mass of heating means 20 at a minimum so that there is an instant response to changes in throttle openings.

Tests were run with heating means 20 installed in engine 11 in the manner shown in FIGS. 1–4 but with inlet and outlet ports 28 and 29 disconnected from conduits 30 and 31, respectively. In other words, no heat was applied to heating means 20. In spite of this, reductions in emitted HC in excess of 14 percent and reductions in emitted CO in excess of 50 percent were recorded, proving that the positioning and shape of heating means 20 and shroud 45 furthers isotropic mixing without any loss of volumetric efficiency. Then, with conduits 30 and 31 connected to inlet and outlet ports 28 and 29, respectively, reductions in emitted HC in excess of 30 percent were noted and now, the emissions of oxides of nitrogen were reduced more than 40 percent, thereby demonstrating the overall effectiveness of the present invention.

While the invention has been described with respect to the preferred physical embodiments constructed in accordance therewith, it will be apparent to those skilled in the art that various modifications and improvements may be made without departing from the scope and spirit of the invention. For example, it will be evident to those skilled in the art from a reading of this description that plate 21 of heating means 20 may be heated with other than hot exhaust gases from exhaust system 16. In other words, a hollow member of the same general size, shape, and materials as member 20 with suitable electrical heating wires affixed immediately adjacent the inner surface of plate 21 could be substituted for heating means 20 with similar results. A pair of wires would be connected between such heating wires and the engine's alternator, such wires being connected to the alternating current leads of the alternator. In this manner, changes in engine speed would cause proportionate changes in the current produced by the alternator and conducted to the heating wires. Therefore, the heat at plate 21 would automatically be regulated to correspond to the amount of fuel striking plate 21. With such a system, conduits 30 and 31 and all other other connections to exhaust system 16 would be eliminated. Accordingly, it is to be understood that the invention is not to be limited by the specific illustrative embodiments, but only by the scope of the appended claims.

I claim:

1. In a gasoline powered internal combustion engine including a carburetor having one or more outlet ports mounted on an intake manifold having one or more mating inlet ports, the improvement comprising means for converting said gasoline to its gaseous state and simultaneously causing isotropic mixing of the gasoline and oxygen molecules, said means comprising:

heating means including a plate having a generally rectangular planar, solid, upper surface, the area of which is equal to or greater than the total area of said carburetor outlet ports;

means for mounting said heating means with said upper surface of said plate directly in the path of the fuel/air mixture exiting said carburetor outlet ports to cause essentially all of the fuel droplets in said fuel/air mixture to splash against said upper surface of said plate and to cause said mixture to follow a tortious path around said plate causing gross turbulence of said fuel/air mixture, said mounting means providing an air flow area around said heating means which is at least as great as the total area of said carburetor outlet ports; and means for applying heat to said heating means in an amount which is directly proportional to the speed of said engine to maintain the temperature of said heating means essentially constant over at least a substantial portion of the range of engine operating speeds, said heating means including means for evenly distributing said applied heat to the entire area of said upper surface.

2. In a gasoline powered internal combustion engine according to claim 1, the improvement wherein said heating means comprises:

a hollow member, said plate defining the top of said member, said member having heat inlet and outlet ports; and wherein said heat distributing means comprises:

at least one vane mounted within said hollow member to cause said heat to follow a tortious path through said member.

3. In a gasoline powered internal combustion engine according to claim 1, the improvement wherein said mounting means comprises:

an annular member defining an enclosed chamber, said annular member having a shape corresponding to the base of said carburetor and being positioned between said base of said carburetor and said intake manifold, said heating means being positioned within said chamber with said upper surface directly in the path of said carburetor outlet ports.

4. In a gasoline powered internal combustion engine including a carburetor having one or more outlet ports mounted on an intake manifold having one or more mating ports, the improvement comprising means for causing isotropic mixing of the gasoline and oxygen molecules, said means comprising:

a plate having a generally rectangular planar, solid, upper surface, the area of which is equal to or greater than the total area of said carburetor outlet ports; and means for mounting said plate with said upper surface thereof directly in the path of the fuel/air mixture exiting said carburetor outlet ports to cause the fuel droplets in said fuel/air mixture to splash against said upper surface of said plate and to cause said mixture to follow a tortious path around said plate causing gross turbulance of said fuel/air mixture, said mounting means providing an air flow area around said plate which is at least as great as the total area of said carburetor outlet ports.

* * * * *